June 12, 1951  L. A. PRATT ET AL  2,556,940
BROACHING MACHINE
Filed June 24, 1946  6 Sheets-Sheet 1

INVENTORS
Leon A. Pratt
Allen W. Hougland
BY Evans + McCoy
ATTORNEYS

June 12, 1951

L. A. PRATT ET AL 2,556,940

BROACHING MACHINE

Filed June 24, 1946

INVENTORS
Leon A. Pratt
Allen W. Hougland
BY Evans & McCoy
ATTORNEYS

INVENTORS
Leon A. Pratt
Allen W. Hougland
BY Evans & McCoy
ATTORNEYS

Patented June 12, 1951

2,556,940

UNITED STATES PATENT OFFICE 2,556,940

BROACHING MACHINE

Leon A. Pratt, Flint, and Allen W. Hougland, Detroit, Mich.; said Hougland assignor to Shatterproof Glass Corporation, Detroit, Mich., a corporation of Delaware Application June 24, 1946, Serial No. 679,000

17 Claims. (Cl. 90—33)

This invention relates to a method of and apparatus for broaching circumferential contours and particularly the broaching of circumferential grooves in a cylindrical blank such as the helicoidal threads of a worm or the like.

The invention has for its object to provide a rapid and economical method of forming circumferential contours by means of linearly moving broaches.

It is also an object of the invention to provide a broaching machine capable of completely forming a circumferential contour on a blank in a single operating stroke.

A more specific object of the invention is to provide a broaching machine capable of completely forming the helicoidal thread of a worm or the like in a single operating stroke.

Another object of the invention is to provide a broaching machine with finishing teeth that are caused to traverse the same path on the blank as the main cutting teeth after the cutting stroke of the broach.

A further object of the invention is to provide a broaching machine for cutting circumferential grooves in a blank which is provided with elongated rows of cutting teeth that move linearly across the periphery of a blank and in which a relative feed movement between the broach and blank is effected by imparting a turning movement to the blank.

The invention also has for an object the provision of a broaching machine capable of generating worm threads of involute contour with straight edged cutting teeth.

A further object is to provide a machine which can be quickly and easily adjusted to vary the inclination of the grooves cut by the broaches in the blank.

A further object is to provide a thread cutting broaching machine in which the blank is subjected to a rough cut and a finishing cut during one reciprocation of the broaches.

With the above and other objects in view, the invention may be said to comprise the method and apparatus as illustrated in the accompanying drawings, hereinafter described and particularly set forth in the appended claims, together with such variations and modifications thereof as will be apparent to one skilled in the art to which the invention pertains.

Reference should be had to the accompanying drawings forming a part of this specification, in which:

Figs. 10 to 14 inclusive are diagrammatic views showing the successive steps of the broaching method.

Referring first to Figs. 10 to 14 of the drawings in which the successive steps of the method of the present invention are illustrated, the blank to be cut is indicated by the reference numeral 1 and the broaches by the reference numeral 2. The blank 1 is of cylindrical form and the broaches 2 are in the form of elongated cutter bars having cutter teeth 3 formed along a longitudinal edge. The bars 2 are tapered at their leading ends for a short distance as indicated at 4. At the beginning of the cutting operation the leading ends of the broaches are positioned for engagement with diametrically opposite portions of the blank 1, with bars 2 extending in opposite directions from the blank, in parallel relation and at fixed distances from the axis of the blank. The broach bars 2 are then moved endwise in opposite directions to cause the tapering ends 4 to enter the blank and make cuts in diametrically opposite portions thereof while the blank is stationary. The edges of the bars 2 are straight throughout the major portion of their length and the distance between the lines along the outer edge of the teeth of the straight portions of the two cutter bars remains at a fixed distance from the blank axis during the stroke so that the cuts across diametrically opposite portions of the blank are completed to the same depth on both sides of the blank when the straight portions of the cutting edges are brought into engagement with the blank. At this point in the operation a turning movement is imparted to the blank 1 at a rate proportional to the rate of linear travel of the broaches so that the grooves or other cuts initially formed by the tapering leading ends of the broach bars are gradually extended throughout the circumference of the blank.

The blank may be moved axially at the same time that it is being turned in order to cut helical grooves therein and the blank may be turned without axial movement when it is desired to cut circumferential grooves or other circular contours.

When annular grooves or contours are being cut with diametrically opposite broaches the cutting operation will be completed during angular movement of the blank through 180° if the speed of angular movement of the blank be properly correlated to the speed of linear movement of the broaches. By employing two broaches each acting upon one half only of the blank, the complete circumferential contour may be cut with broaches of convenient length.

In order to obtain the same advantageous operating characteristics when cutting helical grooves or contours, the rows of cutting teeth on opposite sides of the blank are offset axially a distance equal to one-half the helix pitch and an axial movement equal to the offsetting of the cutting teeth is imparted to the blank during the cutting stroke.

When the helical grooves of a worm or the like are being cut, a series of cutter bars are preferably provided for simultaneously cutting all of the grooves on each side of the blank, each set of cutter bars having their cutting teeth in regularly spaced parallel rows. The set of cutter bars engaging one face of the blank is offset axially with respect to the cutter bars engaging the opposite side of the blank and the turning and axial movements of the blank are so correlated to the linear movements of the broaches that the blank is turned through 180° during the cutting stroke of the broaches and is simultaneously moved axially a distance corresponding to the axial offset between the two sets of broach bars so that the grooves cut by one broach are extended to the grooves cut by the other broach.

Figures 10, 11:
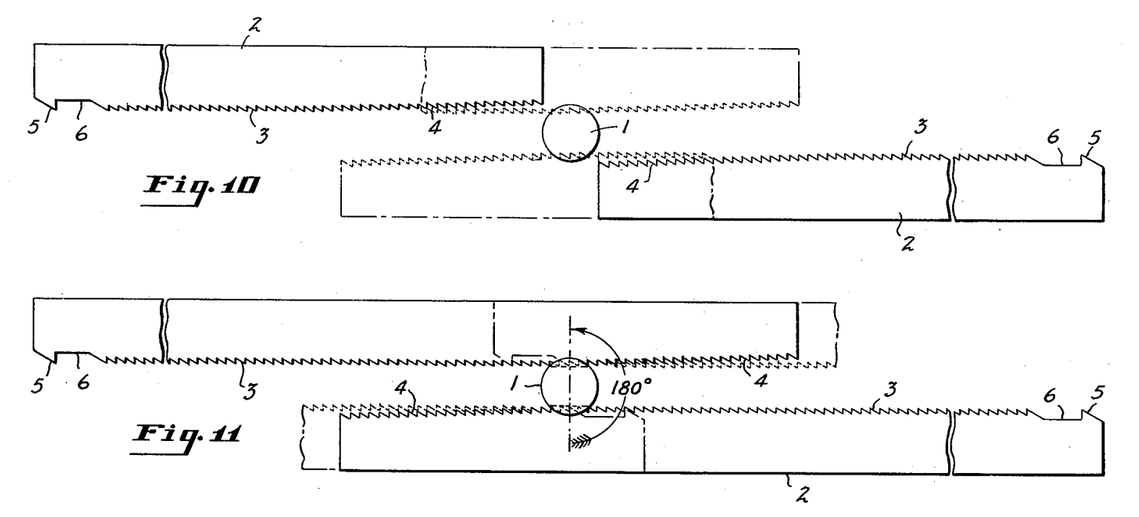
Fig. 10 shows the manner in which the broaches are initially operated to cut into opposite sides of a blank.
Fig. 11 shows the relative movements of the broaches and blank as the initial cuts are being extended around the periphery of the blank.

During the cutting stroke of the broaches grooves are initially formed by the tapered portions 4 of the broach bars on opposite sides of the blanks, after which a turning movement is imparted to the blank and the grooves are gradually extended until the grooves cut by one set of bars meet the grooves cut by the other set of bars, thus completing the grooves throughout the circumference of the blank, and cutting a complete worm in one stroke of the broaches.

Figure 12:
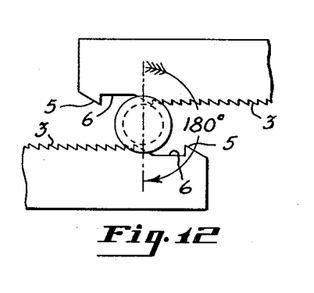
Fig. 12 shows the blank being returned to its starting position while the gaps between the broach cutter teeth are passing the blank.
Figure 13:
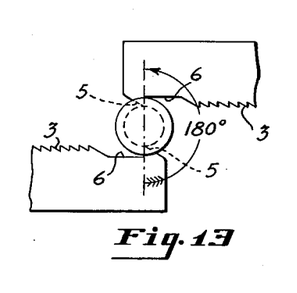
Fig. 13 shows the finishing operation.

In the machine of the present invention means is provided for giving the blank a finishing cut after the completion of the cutting stroke of the broaches and to this end each of the broach bars is provided with a finishing tooth 5 adjacent its trailing end, that is separated from the cutting teeth by a gap or recess 6 in the edge of the broach bar. As the broaches approach the ends of their cutting stroke, the cutting teeth 3 pass the blank 1, bringing the gap 6 into registry with the blank so that the blank is momentarily disengaged from the cutters as shown in Fig. 12. During the passage of the gap 6 past the opposite faces of the blank, the blank is rapidly returned to its original position by rotating it reversely through 180° and by simultaneously moving it axially if helicoidal cuts are being taken. When the broach bars 2 reach the ends of their stroke the finishing teeth 5 are brought into engagement with the blank and at this point in the operation the broach bars are stopped and held in the position shown in Fig. 13 while the blank 1 is being turned through an angle of 180°. The blank 1 is in its original position when the cutter teeth 5 are brought into engagement with it, and the movements originally imparted to the blank are again imparted thereto, the teeth 5 being caused to pass through the entire extent of the grooves previously cut by the longitudinal rows of teeth 3.

Figure 14:
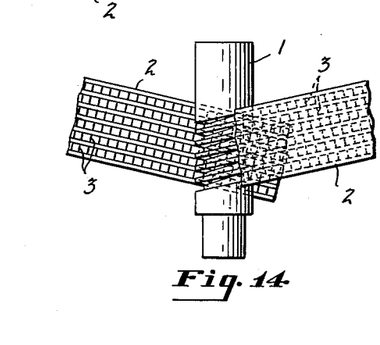
Fig. 14 shows the broaches adjusted at angles with respect to the blank axis corresponding to the helix angle of the thread being cut.

In cutting worms it may be desirable to set the broach bars at the angle of the helix as shown in Fig. 14, which will permit the use of wider and stronger cutting teeth and which will also make it possible to use cutting teeth with straight cutting edges which will generate involute helicoidal tooth surfaces. The cutting teeth 3 of the broach bars may be of uniform width and depth throughout the length of the bars since the depth of the cut taken by the individual teeth is regulated by the rate of turning movement of the blank 1.

Figures 3, 4:
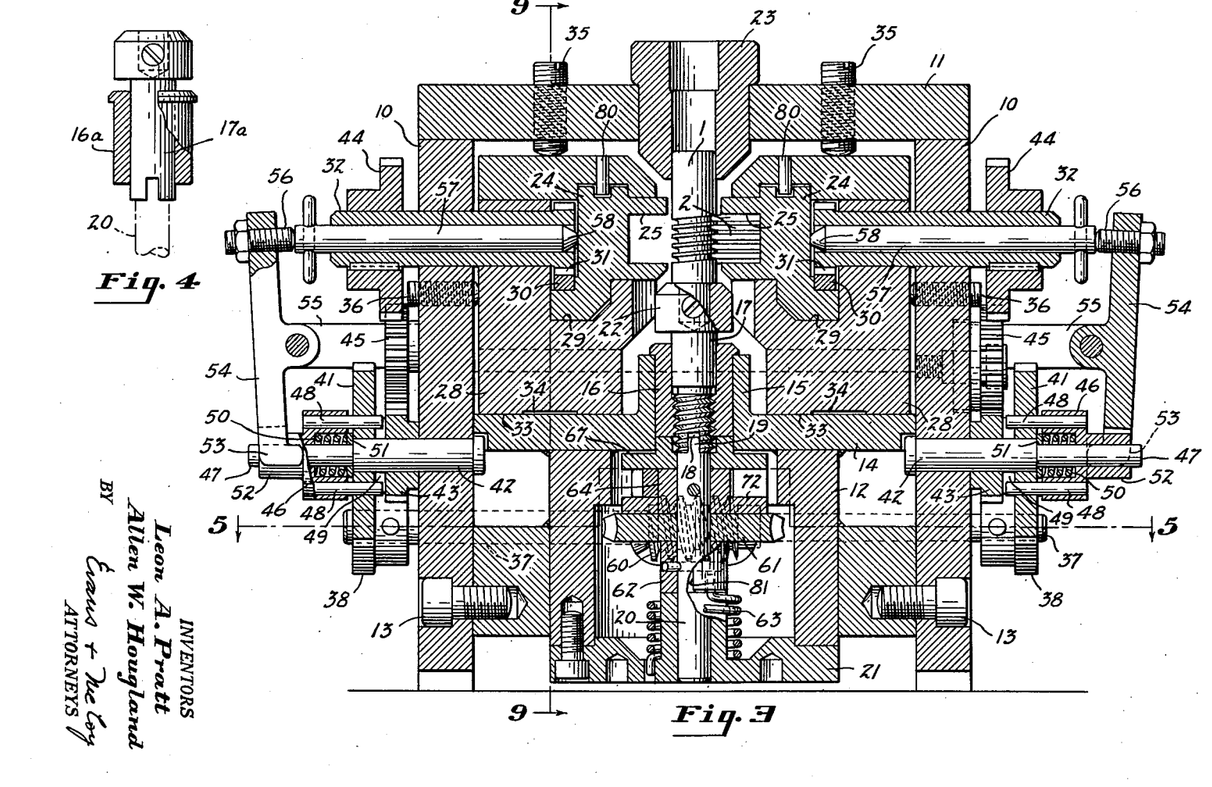
Fig. 3 is a vertical section taken on the line indicated at 3—3 in Fig. 2.
Fig. 4 is a fragmentary sectional view showing a modified form of blank holder such as used for cutting circumferential grooves or circular contours.
Figure 5:
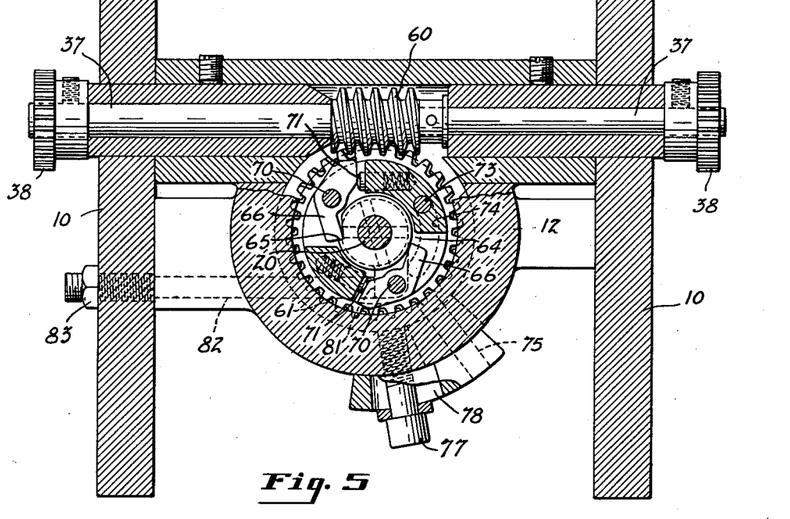
Fig. 5 is a horizontal section taken on the broken line indicated at 5—5 in Fig. 3.
Figure 6:
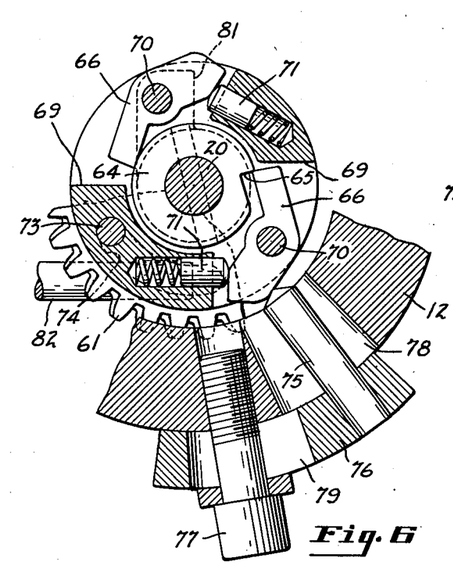
Fig. 6 is a fragmentary view similar to Fig. 5 showing an actuating pawl at the position where it is disengaged from the blank holder actuating shaft.
Figure 7:
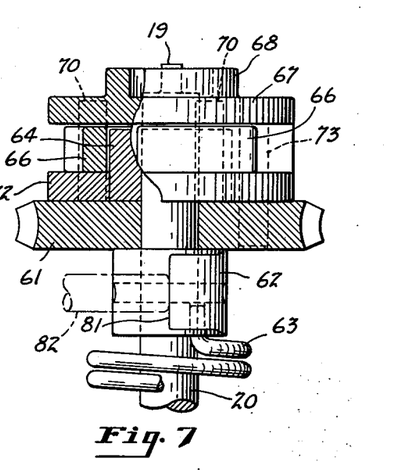
Fig. 7 is a fragmentary side elevation of the blank holder actuating mechanism with a portion thereof broken away and shown in section.

In Figs. 1 to 9 of the drawings, a machine suitable for performing the operations above described is illustrated. This machine has a supporting frame provided with side standards 10 which are connected across the top of the machine by a top plate 11 secured by any suitable means to the upper ends of the standards 10. Adjacent the base of the machine a gear housing 12 is mounted between the standards 10 and secured thereto by suitable means such as bolts 13. On the top of the gear housing 12 there is supported a horizontal bed 14, which as shown in Fig. 3 has a central upstanding boss 15 which is bored to receive an internally threaded sleeve 16 which is secured by suitable means against turning movement in the bed. The internally threaded sleeve 16 receives a threaded arbor 17 which is screwed into the sleeve and which is provided at its lower end with a diametrical slot 18 which receives a key 19 carried upon the upper end of an actuating shaft 20 which is vertically disposed in axial alinement with the arbor 17 and which is journaled in a bottom wall 21 of the gear housing 12 which is detachably secured to the bottom of said housing. Turning movements of the shaft 20 cause rotation of the arbor 17 in the sleeve 16, moving the arbor axially within the sleeve because of the threaded connection between the arbor and sleeve. The arbor 17 is provided with a blank holding chuck 22 at its upper end in which the blank 1 is clamped in axial alinement with the arbor 17. The blank 1 is clamped at its lower end in the chuck 22 and slides at its upper end in a guide sleeve 23 mounted in the top plate 11. The guide sleeve 23 is removably mounted in the plate 11 so that it can be readily replaced with sleeves to fit different sized blanks. The threaded sleeve 16 and the arbor 17 are also readily removable and replaceable with other sleeves and arbors with screw threads of different pitches to provide the desired rate of axial feed of the blank. For cutting circumferential grooves or other annular contours, the threaded connection between the sleeve 16 and arbor 17 is omitted. As shown in Fig. 4, a sleeve 16a may be provided which has a cylindrical bore to receive a smooth cylindrical arbor 17a through which a turning movement may be imparted to a blank being cut without moving the blank axially.

The broach bars 2 are mounted in broach holders 24 which are in the form of elongated bars provided with inwardly facing recesses 25 to receive the broach bars which are mounted in channeled positioning blocks 26 secured in the ends of the recesses 25 by suitable means such as screws 27. The broach holders 24 are mounted in supporting members 28 which have recesses 29 in which the bars 24 have a sliding fit. Each of the broach holders 24 carries a longitudinally extending rack 30 and each rack 30 meshes with a gear 31 fixed to a horizontal tubular shaft 32 journaled in the adjacent side standard 10. The racks 30 are on the outer sides of the holders 24, and the shafts 32 which are in axial alinement are journaled in the opposite side standards 10. The supporting members 28 are provided with arcuate bases 33 which are coaxial with the shafts 32, the arcuate bases 33 being slidable in arcuate recesses 34 formed in the top face of the bed 14. The supporting members 28 are adjustable about the axes of the shafts 32 by suitable means such as set screws 35 in the top plate 11 engaging the top faces of the members 28 on opposite sides of the axes of the shafts 32. By adjusting the screws 35, the supporting members 28 may be set at various angles to the axis of the blank 1. The supporting members 28 are also adjustable laterally on the bed 14 toward and away from the axis of the blank, the members 28 being held in the desired positions of lateral adjustment by suitable means such as screws 36.

Figure 1:
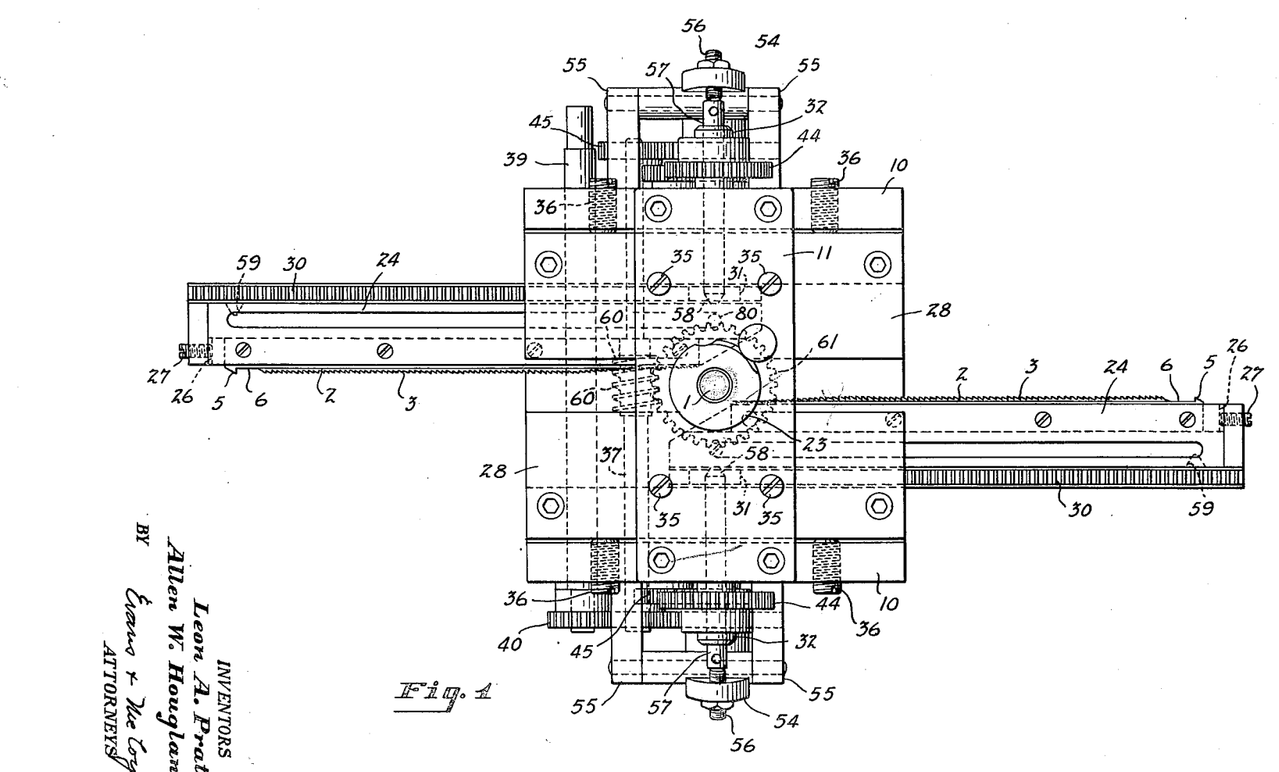
Figure 1 is a top plan view of a broaching machine embodying the invention.
Figure 2:
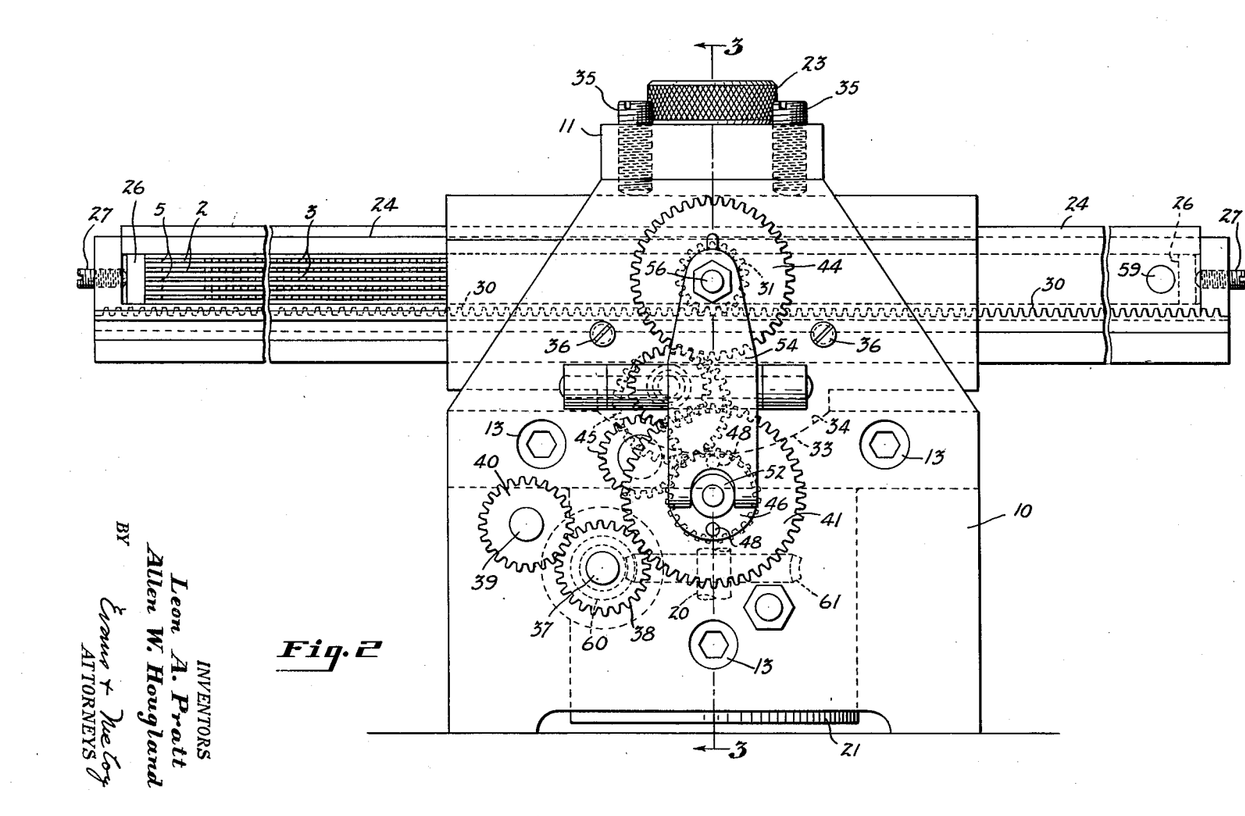
Fig. 2 is a side elevation of the machine.
Figure 8:
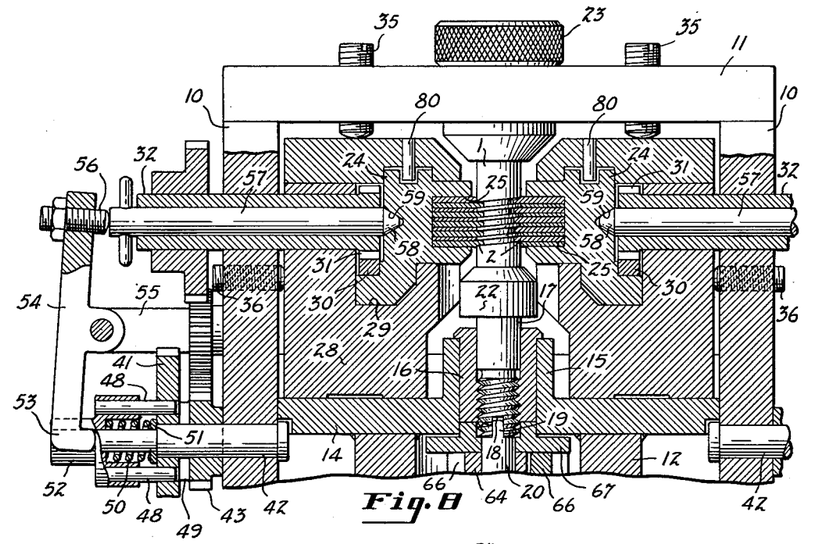
Fig. 8 is a fragmentary section taken on the same line as Fig. 3, showing the broaches locked against movement and the broach actuating mechanism disconnected.
Figure 9:
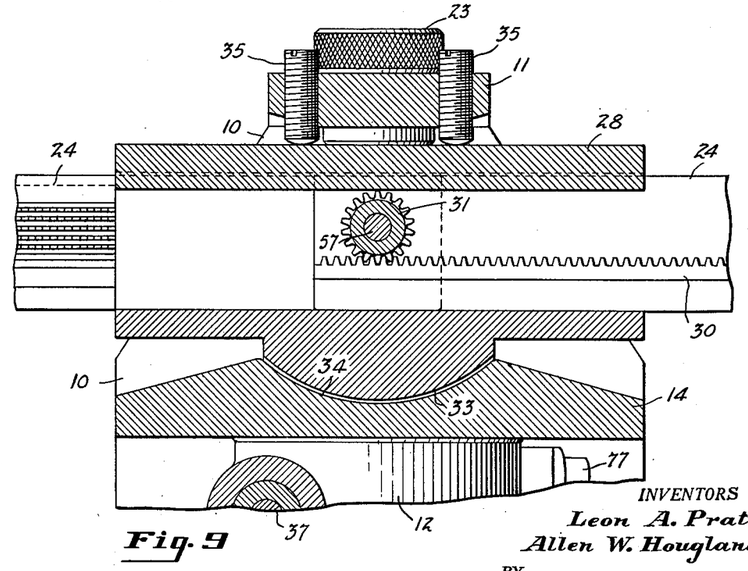
Fig. 9 is a vertical section taken alongside one of the broach racks.

In order to impart the desired correlative movements to the broaches and blank, actuating mechanism in the form of gearing operated by a common power shaft is employed. As shown in Figs. 1 and 3, a cross shaft 37 is journaled adjacent its ends in the side standards 10 and has identical gears 38 attached to its opposite ends. The cross shaft 37 may be driven from a power shaft 39 through a gear 40 meshing with one of the gears 38. The blank actuating shaft 20 and the broach actuating shafts 32 are both driven from the cross shaft 37. The drive to the broaches is through large gears 41 which mesh with the gears 38 and which are rotatably mounted on stub shafts 42 mounted in the standards 10. A small gear 43 also mounted on such shaft 42 is driven by the gear 41 on the same shaft and gears 44 on the shafts 32 are driven from the small gears 43 through intermediate gears indicated generally by the numeral 45. The drive from the cross shaft 37 to each of the broach operating shafts 32 is clutch controlled. As best shown in Figs. 3 and 8, a clutch member 46 is slidably mounted on the reduced outer end 47 of each of the shafts 42. The clutch members 46 carry axially extending pins 48 that extend through openings in the large gears 41, the pins 48 being slidable in the gears 41 and engageable with lugs 49 on the outer faces of the gears 43.

The clutch members 46 are pressed outwardly by coil springs 50 mounted in recesses in the inner faces of the clutch members and engaging with washers 51 that fit upon the reduced end portions 47 of the shaft 42 and engage shoulders at the inner ends of the said reduced portions. The clutch members 46 have outwardly projecting hubs 52 that are straddled by forks 53 of actuating levers 54 that are pivoted centrally to brackets 55 attached to the standards 10 and that carry adjustable abutment screws 56 at their upper ends for engagement with the outer ends of latch pins 57 that are slidably mounted in the tubular shafts 32. The pins 57 have pointed inner ends 58 which engage in tapering recesses 59 in the broach holders 24. The recesses 59 are located adjacent the trailing ends of the broach holders 24 so that the latch pins 57 are held by the flat faces of the broach holders 24 in their outermost positions during the cutting stroke of the broaches, and the broach holders are locked against movement when the finishing teeth 5 are brought to blank engaging position. The levers 54 are pressed against the outer ends of the latch pins 57 by the springs 50 so that the latch pins 57 are forced into the recesses 59 when the pointed ends 58 are brought into registry with the recesses. The outward movement of the clutch members 46 caused by the spring 50 upon engagement with the latch pins 57 with the recesses of the broach holders, causes the clutch pins 48 to be moved out of engagement with the lugs 49 of the gears 43 so that the driving connections between the shaft 37 and the rack operating shafts 32 are disconnected, with the result that the broach holders 24 are locked against further movement.

The drive from the cross shaft 37 to the blank 1 is through a worm 60 on the shaft 37 that meshes with a worm gear 61 that is rotatably mounted on the vertical actuating shaft 20. The worm gear 61 is supported upon a collar 62 that is pinned to the shaft 20 and which is connected to the bottom plate 21 of the gear housing through a coil spring 63 which is connected at its upper end to the collar and at its lower end to the bottom plate 21. Above the worm gear 61, a ratchet collar 64 is attached to the shaft 20 and this collar has a single notch 65 that is adapted to be engaged by either of two pawls 66 that are mounted diametrically opposite each other upon the under side of a carrier 67 which is rotatable on the shaft 20. The carrier 67 has a hub portion 68 journaled in the central bore of the bed 14 and is provided with recesses 69 on its under side in which the pawls 66 are mounted. The pawls 66 are connected to the carrier 67 by means of vertical pivots 70 and each is urged toward ratchet engaging position by means of a spring pressed plunger 71. The carrier 67 is supported upon a washer 72 resting upon the upper face of the worm gear 61.

The worm gear 61 drives the carrier 67 through a vertical pin 73 that is attached to the carrier 67 and that engages in an arcuate slot 74 in the gear 61. The arcuate slot 74 provides a lost motion connection between the driving means and the blank actuating shaft which delays the actuation of the blank during the initial portion of the cutting stroke of the broaches so that the cuts will be formed in opposite sides of the blank by the tapered portions 4 of the broach bars before the blank begins to turn. When the pin 73 has traversed the length of the slot 74, the carrier 67 begins to turn and imparts turning movement to the shaft 20, and through the shaft 20 and arbor 17 to the blank 1. This turning movement is continued through an angle of approximately 180°, after which the pawl engaging the ratchet collar 64 is disengaged. The disengagement of the pawl from the ratchet collar is effected by means of a releasing pin 75 that is carried by an arcuate plate 76 secured to the wall of the housing 12 by suitable means such as a screw 77. The pin 75 extends radially through the wall of the housing 12 into the path of the pawls 66 and is positioned approximately 180° from the point in which the pawl originally engages the ratchet collar. The pin 75 preferably has some angular adjustment and this adjustment may be provided by a slot 78 in the wall of the housing 12 which permits circumferential shifting of the pin 75, and a slot 79 in the plate 76 that receives the screw 77 so that the plate 76 may be adjusted circumferentially to position the pin 75.

The pawl 66 engaging the notch 65 of the collar 64 comes into engagement with the releasing pin 75 at the time when the last of the cutting teeth 3 of the broaches has moved past the blank 1 and the blank is positioned as shown in Fig. 12, free from the broach teeth, so that upon the release of the pawl the blank is reversely rotated by the spring 63 to its original position just prior to the locking of the broach holders by the latch pins 57. After the reverse rotation the second pawl 66 engages the notch 65 of the collar 64 to again impart forward rotation to the blank so that the finishing teeth 5 are caused to move through the grooves previously cut by the cutting teeth 3 of the broaches. After the completion of the finishing cut, the blank is removed from the machine and the broaches and blank holders are returned to their starting positions. After the finishing cut, the blank holder is automatically returned to its starting position by the spring 63 and the broach holders 24 may be returned to their starting positions by reversely operating the shaft 37 with the levers 54 held in latch releasing clutch engaging position. Suitable stops 80 may be provided on the supporting members 28 to limit the movements of the broach holders 24 in the supporting members. The reverse rotation of the shaft 37 imparts no movement to the shaft 20 since the pawl 66 rides over the notches 65 in this direction of rotation. The reverse rotation, however, brings the pin 73 to the trailing end of the arcuate slot 74 in proper position for the start of the next operation.

Means independent of the ratchet 64 and pawls 66 is preferably provided for limiting the reverse rotation of the shaft 20 by the spring 63. The collar 62 is provided with a peripheral stop shoulder 81 that moves away from a fixed stop 82 during the cutting stroke of the broaches and backs into engagement with the stop 82 when the shaft 20 is reversely actuated by the spring 63. The stop 82 is in the form of a threaded pin mounted in the frame tangentially with respect to the collar 62 and adapted to be adjusted axially by means of a nut 83. By adjustment of the stop 82 the shaft 20 may be stopped in a position in which the pin 73 is spaced slightly from an end of the slot 74 and with the shoulder 65 slightly spaced from a pawl 66.

It is to be understood that variations and modifications of the specific devices herein shown and described for purposes of illustration, may be made without departing from the spirit of the invention.

What we claim is:

1. A broaching machine comprising a rotatable blank holder, a broach bar having a toothed longitudinal cutting edge straight throughout a major portion of its length and having a leading end portion inclined with respect to said straight portion, means for supporting said broach bar for endwise movement transverse to the axis of the blank holder across a peripheral portion of a blank and for maintaining the straight portion of the cutting edge at a fixed distance from the axis of the blank holder during its movement across the blank, means for actuating the bar to engage the inclined leading end of its cutting edge with a blank to enter the cutting edge into the blank, and means for turning the blank holder during the engagement of the straight portion of the cutting edge with the blank to extend the cut circumferentially of the blank.

2. A broaching machine comprising a rotatable blank holder, a broach bar having a toothed longitudinal cutting edge straight throughout a major portion of its length and having a leading end portion inclined with respect to said straight portion, means for supporting said broach bar for endwise movement transverse to the axis of the blank holder across a peripheral portion of a blank and for maintaining the straight portion of the cutting edge at a fixed distance from the axis of the blank holder during its movement across the blank, means for actuating the bar to engage the inclined leading end of its cutting edge with a blank to enter the cutting edge into the blank, and means for turning the blank holder and simultaneously imparting an axial movement thereto during engagement of the straight portion of the cutting edge with the blank to extend the cut helically.

3. A broaching machine comprising a rotatable blank holder, a broach bar having a longitudinal cutting edge having cutting teeth throughout the major portion of its length, said bar having a finishing tooth adjacent its trailing edge and an elongated recess in advance of said tooth, means for supporting said bar for endwise movement across a peripheral portion of a blank carried by said holder, means for simultaneously moving said bar and rotating said blank holder, and means for holding said bar stationary with its finishing tooth engaging the blank and rotating the holder.

4. A broaching machine comprising a rotatable blank holder, a broach bar having a longitudinal cutting edge having cutting teeth throughout the major portion of its length, said bar having a finishing tooth adjacent its trailing edge and an elongated recess in advance of said tooth, means for supporting said bar in a position transverse to the axis of the blank holder and for moving the same endwise across a peripheral portion of a blank carried by said holder, means for turning said blank holder and simultaneously moving the same axially during the cutting stroke of said bar, means for reversely turning and axially moving the blank holder while the peripheral portion of the blank is in said cutter bar recess, and means for stopping the cutter bar with its finishing tooth in engagement with the blank and for turning the blank holder and moving the same axially while the bar is so held.

5. A broaching machine comprising a rotatable blank holder, a broach bar having a toothed longitudinal cutting edge, means for supporting said bar in a position transverse to the axis of said holder and for imparting a cutting stroke thereto endwise across a peripheral portion of a blank carried by said holder, and means for simultaneously turning said blank holder and imparting an axial movement thereto during a portion of the cutting stroke of said bar.

6. A broaching machine comprising a rotatable blank holder, a broach bar having a toothed longitudinal cutting edge, means for supporting said bar in a position transverse to the axis of said holder and for imparting a cutting stroke thereto endwise across a peripheral portion of a blank carried by said holder, and power operated driving means for imparting a cutting stroke to said bar and turning said blank holder, said driving means having a lost motion connection to said blank holder whereby turning motion is imparted to said holder only after a predetermined movement of said bar.

7. A broaching machine comprising a rotatable blank holder, broach bars each having a toothed longitudinal cutting edge that is straight throughout a major portion of its length and having a portion at its leading end that is inclined with respect to the straight portion, means for supporting said bars transverse to the axis of the blank holder and on opposite sides thereof with the leading ends of their cutting edges positioned for engagement with opposite peripheral portions of a blank carried by said holder, means for simultaneously imparting endwise cutting strokes to said bars along lines at fixed distances from the axis of the blank, and means for turning said blank holder at a speed proportional to the linear speed of the broach bar during engagement of the straight portions of said cutting edges with the blank.

8. A broaching machine comprising a rotatable blank holder, broach bars each having a toothed longitudinal cutting edge that is straight throughout a major portion of its length and having a portion at its leading end that is inclined with respect to the straight portion, means for supporting said bars transverse to the axis of the blank holder and on opposite sides thereof with the leading ends of their cutting edges positioned for engagement with opposite peripheral portions of a blank carried by said holder, means for simultaneously imparting endwise cutting strokes to said bars along lines at fixed distances from the axis of the blank, and means operated by said bar actuating means for turning said blank holder at a speed proportional to the linear speed of the broach bar during engagement of the straight portions of the bar with the blank and for simultaneously imparting an axial movement to said holder.

9. A broaching machine comprising a rotatable blank holder, broach bars each having a toothed longitudinal cutting edge that is straight throughout a major portion of its length and having a portion at its leading end that is inclined with respect to the straight portion, means for supporting said bars transverse to the axis of the blank holder and on opposite sides thereof with the leading ends of their cutting edges positioned for engagement with opposite peripheral portions of a blank carried by said holder, means for simultaneously imparting endwise cutting strokes to said bars along lines at fixed distances from the axis of the blank, and power operated means including a drive shaft, gearing connecting said shaft to said broach bars to impart cutting strokes thereto and gearing connecting said shaft to said blank holder to impart turning movements thereto, the latter gearing including a lost motion connection whereby rotation of the blank holder is delayed to permit the inclined portions of said cutting edges to enter the blank while it is held stationary.

10. A broaching machine comprising a rotatable blank holder, a pair of elongated broach holders having longitudinal rows of cutting teeth, means for supporting said holders on opposite sides of the axis of the work holder with said rows of teeth positioned to engage opposite sides of a blank carried by said blank holder and extending transversely of the axis, the cutting teeth of one broach holder being offset axially with respect to the teeth of the other broach holder, means for simultaneously imparting an endwise cutting stroke to said broach holders, means for turning the blank holder through an angle of 180° during the cutting stroke, and means for moving the blank holder axially a distance corresponding to the axial offset of the teeth of the two broach holders.

11. A broaching machine comprising a rotatable blank holder, a pair of elongated broach holders having longitudinal rows of cutting teeth, means for supporting said holders on opposite sides of the axis of the work holder with said rows of teeth positioned to engage opposite sides of a blank carried by said blank holder and extending transversely of the axis, the cutting teeth of one broach holder being offset axially with respect to the teeth of the other broach holder, means for simultaneously imparting an endwise cutting stroke to said broach holders, means for turning the blank holder through an angle of 180° during the cutting stroke, means for moving the blank holder axially a distance corresponding to the axial offset of the teeth of the two broach holders, and means for adjusting said broach holders to different angular positions with respect to the blank holder axis.

12. A broaching machine comprising a rotatable blank holder, a pair of elongated broach holders, each having longitudinal rows of cutting teeth and a finishing tooth alined with the teeth of each row at its trailing end with a gap between each finishing tooth and the teeth with which it is alined, means for supporting said holders on opposite sides of the axis of the blank holder with the teeth thereof in position to engage opposite sides of a blank held by said blank holder, means for simultaneously moving said holders endwise in opposite directions, means for turning said blank holder while said rows of teeth are moved past the blank, means for returning the blank holder to its original position while the blank is disposed in said gaps, means for stopping the broach holders with their finishing teeth in blank engaging position, and means for again turning the blank holder in the direction in which it turns during the endwise movement of said broach holders.

13. A broaching machine comprising a rotatable blank holder, a pair of elongated broach holders, each having longitudinal rows of cutting teeth and a finishing tooth alined with the teeth of each row at its trailing end with a gap between each finishing tooth and the teeth with which it is alined, means for supporting said holders on opposite sides of the axis of the blank holder with the teeth thereof in position to engage opposite sides of a blank held by said blank holder, means for simultaneously moving said holders endwise in opposite directions, means for turning said blank holder while said rows of teeth are moved past the blank, means for moving the blank holder axially during its turning movement, means for returning the blank holder to its original position while the blank is disposed in said gaps, means for stopping the broach holders with their finishing teeth in blank engaging position, and means for turning the blank holder and moving the same axially while the broach holders are held against movement.

14. A broaching machine comprising a rotatable blank holder, a pair of elongated broach holders each having parallel longitudinal rows of cutting teeth, said teeth being of uniform width and depth and arranged in straight lines throughout the major portion of the length of said rows, the outer edges of the teeth adjacent the leading ends of said holders being arranged at a slant with respect to said straight lines, means for supporting said holders at opposite sides of the axis of the blank holder with their leading ends in opposed positions with respect to the blank held by said blank holder, and power operated means comprising a driving member and gearing for imparting opposite endwise movements to said broach holders and for turning said blank holder, the gearing for turning the blank holder having a lost motion connection to said driving member whereby cuts are made in said blank by the slantingly disposed teeth before the blank holder begins to turn.

15. A broaching machine comprising a rotatable blank holder, a pair of elongated broach holders each having parallel longitudinal rows of cutting teeth, said teeth being of uniform width and depth and arranged in straight lines throughout the major portion of the length of said rows, the outer edges of the teeth adjacent the leading ends of said holders being arranged at a slant with respect to said straight lines, means for supporting said holders at opposite sides of the axis of the blank holder with their leading ends in opposed positions with respect to the blank held by said blank holder, power operated means comprising a driving member, gearing for imparting opposite endwise movements to said broach holders and for turning said blank holder, the gearing for turning the blank holder having a lost motion connection to said driving member whereby cuts are made in said blank by the slantingly disposed teeth before the blank holder begins to turn, and means for moving said blank holder axially during its turning movements.

16. A broaching machine comprising a rotatable blank holder, a pair of elongated broach holders each having parallel longitudinal rows of cutting teeth, said teeth being of uniform width and depth and arranged in straight lines throughout the major portion of the length of said rows, the outer edges of the teeth adjacent the leading ends of said holders being arranged at a slant with respect to said straight lines, means for supporting said holders at opposite sides of the axis of the blank holder with their leading ends in opposed positions with respect to the blank held by said blank holder, power operated means comprising a driving member, gearing for imparting opposite endwise movements to said broach holders and for turning said blank holder, the gearing for turning the blank holder having a lost motion connection to said driving member whereby cuts are made in said blank by the slantingly disposed teeth before the blank holder begins to turn, means for moving said blank holder axially during its turning movements, and means for adjusting said broach holders to vary their angular position with respect to the blank holder axis.

17. A broaching machine comprising a frame, a blank holder rotatably mounted in the frame, a pair of elongated broach holders on opposite sides of the axis of the blank holder and each provided with a longitudinal rack, shafts on opposite sides of the blank holder disposed perpendicular to the blank axis, gears on said shafts meshing with said racks, supporting members mounted in said frame in which said broach holders are guided for endwise movements, means for adjusting each of said supporting members bodily toward or away from the axis of the blank holder and angularly about the axis of said shafts, means for driving said shafts to actuate the broach holders, and means for imparting a turning movement and an axial movement to the blank holder during the stroke of said broach holders.

LEON A. PRATT.
ALLEN W. HOUGLAND.

REFERENCES CITED

The following references are of record in the file of this patent:

UNITED STATES PATENTS

| Number | Name | Date |
| --- | --- | --- |
| 137,769 | Forrest | Apr. 15, 1873 |
| 482,211 | Tucker | Sept. 6, 1892 |
| 876,277 | La Pointe | Jan. 7, 1908 |
| 1,443,058 | Taylor | Jan. 23, 1923 |
| 1,503,996 | Perkins | Aug. 5, 1924 |
| 2,136,680 | Floeter | Nov. 15, 1938 |
| 2,177,147 | Mattson | Oct. 24, 1939 |
| 2,242,578 | Floeter | May 20, 1941 |
| 2,372,818 | Dostal | Apr. 3, 1945 |